(12) United States Patent
Peera et al.

(10) Patent No.: US 8,785,532 B2
(45) Date of Patent: Jul. 22, 2014

(54) DIAMINO-ALCOHOL COMPOUNDS, THEIR MANUFACTURE AND USE IN COATINGS APPLICATIONS

(75) Inventors: Asghar A. Peera, Buffalo Grove, IL (US); Ian A. Tomlinson, Midland, MI (US)

(73) Assignees: ANGUS Chemical Company; Dow Global Technologies LLC

( * ) Notice: Subject to any disclaimer, the term of this patent is extended or adjusted under 35 U.S.C. 154(b) by 68 days.

(21) Appl. No.: 12/928,673

(22) Filed: Dec. 16, 2010

(65) Prior Publication Data

US 2011/0152401 A1 Jun. 23, 2011

Related U.S. Application Data

(60) Provisional application No. 61/284,608, filed on Dec. 22, 2009.

(51) Int. Cl.
*C08K 5/17* (2006.01)

(52) U.S. Cl.
USPC .................................. 524/249; 524/250

(58) Field of Classification Search
USPC .................................. 524/249, 250
See application file for complete search history.

(56) References Cited

U.S. PATENT DOCUMENTS

| | | | |
|---|---|---|---|
| 2,475,996 A | | 7/1949 | Smith |
| 5,227,198 A | * | 7/1993 | Laura et al. .................. 427/373 |
| 5,270,161 A | | 12/1993 | Pitt et al. |

FOREIGN PATENT DOCUMENTS

| | | |
|---|---|---|
| WO | 2008081036 A1 | 7/2008 |
| WO | 2008088632 A2 | 7/2008 |
| WO | 2010126657 A1 | 11/2010 |

* cited by examiner

*Primary Examiner* — Kriellion Sanders

(57) ABSTRACT

A new class of compounds, namely diamino alcohols, is described, along with a process for their production and their use as dispersing additives for coating formulations.

7 Claims, 1 Drawing Sheet

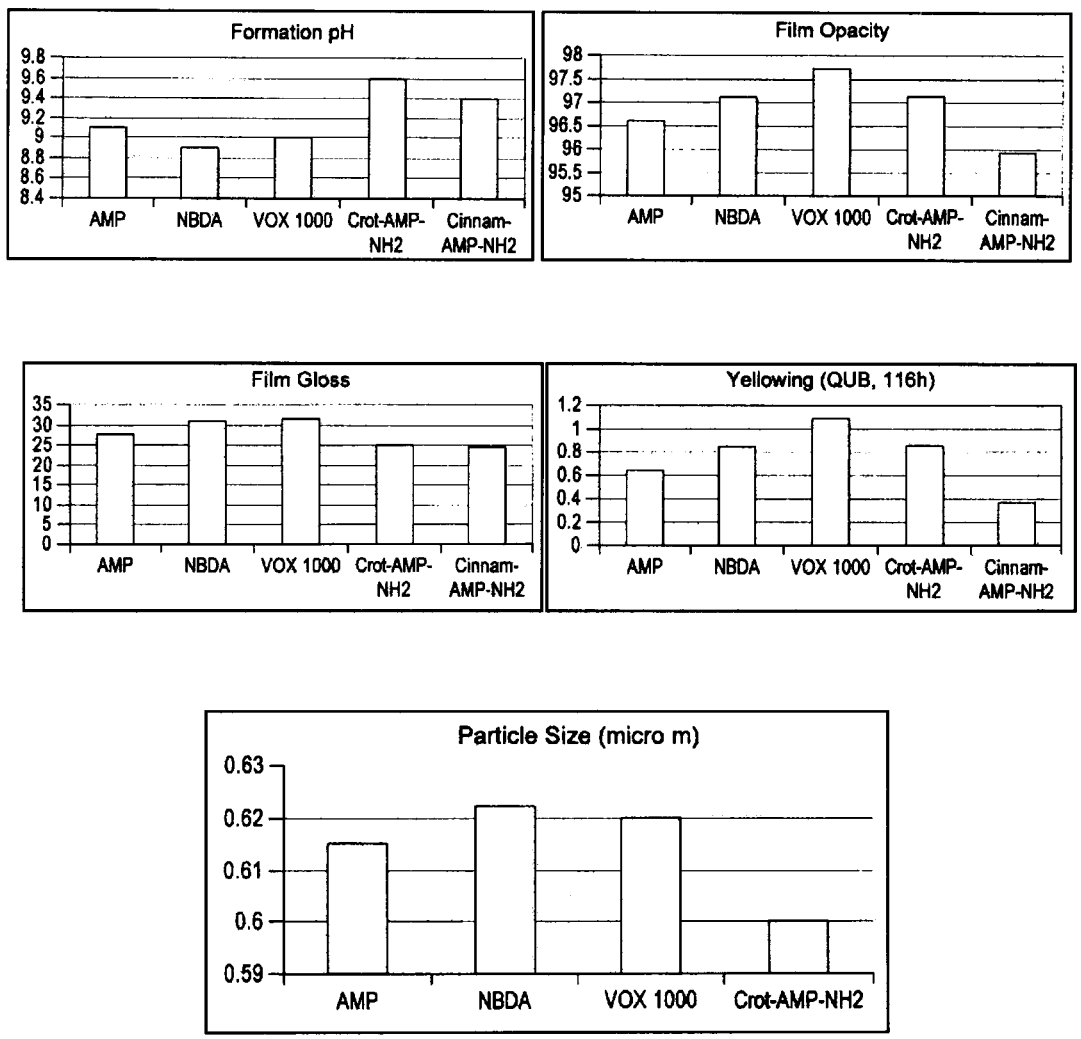

DIAMINO-ALCOHOL COMPOUNDS, THEIR MANUFACTURE AND USE IN COATINGS APPLICATIONS

This application claims the benefit of priority under 35 U.S.C. §119(e) of U.S. Provisional Patent Application No. 61/284,608 filed on Dec. 22, 2009.

FIELD OF THE INVENTION

The present invention relates to a new class of compounds, namely diamino alcohols, a process for producing same, and their uses as dispersants in coating formulations.

BACKGROUND OF THE INVENTION

Simple amine compounds are known to provide neutralizing, dispersant and hardening properties when added to coatings, mineral slurries and epoxy formulations. Methods for simple amine compound manufacture are well-documented and known in the art, and when the goal is to prepare primary amines, the preferred routes often involve intermediate nitro alcohol compounds. For various reasons, it would be advantageous to have compounds with more than one amino group and low volatile organic compound ("VOC") content.

Volatile organic compounds are organic chemical compounds that have high enough vapor pressures under normal conditions (i.e., 1 atmosphere and 25° C.) to significantly vaporize and enter the atmosphere. They include a variety of chemicals, many of which have adverse health effects, and are emitted by a wide variety of products including but not limited to: paints and lacquers, paint strippers, cleaning supplies, pesticides, building materials and furnishings, office equipment such as copiers and printers, correction fluids and carbonless copy paper, graphics and craft materials including glues and adhesives, permanent markers, and photographic solutions. Minimization of VOC content has become the focus of public attention as well as government regulation.

Processes for the manufacture of the intermediate nitro alcohol compounds, are known and typically involve nitro aldol reaction (Henry Reaction) between nitroalkanes and aldehydes. There has been occasional reference to the preparation of dinitro alcohols involving a tandem Michael addition and Henry reaction of a nitroalkane with an α,β-unsaturated aldehyde. For example, see "Secondary dinitro alcohols," Smith, Curtis W. (Shell Development Co.) 1949, and U.S. Pat. No. 2,475,996, which describe the manufacture of the nitro alcohol 2,5,6-trimethyl-2,6-dinitro-3-heptanol. This nitro alcohol is also prepared as an intermediate to making a vasopeptidase inhibitor, as discussed in Efficient Asymmetric Synthesis of the Vasopeptidase Inhibitor BMS-189921 by Janak Singh et al., Org. Lett. (2003), 5, 17, 3155-3158. In addition, manufacture of the nitro alcohol compound 2,6-dinitro-5-phenyl-heptan-3-ol has been described in David St. Clair Black et. al. Australian Journal of Chemistry, 1976, 29(11), 2511. As is also well-established, nitro alcohol compounds may be readily converted to the aminoalcohol compounds by hydrogenation with hydrogen over a suitable catalyst, for example Raney nickel or a platinum- or palladium-based catalyst (Pt or Pd in elemental form or as oxides, with or without supports, e.g., carbon). Those skilled in the art are also aware that other reducing agents which will reduce nitroalkanes to primary amines include metal/acid combinations, e.g., iron/acetic acid; and aluminum hydrides. The preferred reducing agents include hydrogen gas in combination with any of the following catalysts: Raney nickel, platinum or palladium.

Diamino alcohol compounds and their uses, on the other hand, are not currently represented in the prior art.

Amino alcohols such as 2-amino-2-methyl-1-propanol ("AMP") are used in aqueous based paint formulations as neutralizing amines which effectively co-disperse pigments. In many geographies paint manufacturers are facing additional regulations to reduce the VOC content of their formulations and consumer preference is driving the development of low odor paint formulations. Neutralizing amines such as AMP are 100% volatile according to a modified EPA Test Method 24 and, when used in a low VOC paint formulation, the amine odor of AMP becomes more noticeable. Two options as neutralizers that are by definition no VOC contributors are ammonia and inorganic bases such as KOH. Ammonia, while an efficient neutralizer, has a very strong odor and is, therefore, unsuitable for use in low odor paint formulations. The use of inorganic bases such as KOH, produce coatings with poor scratch and mar resistance. Additionally, neither ammonia nor the inorganic bases have the ability to aid in the dispersion of pigments in the formulation.

There is a need for efficient organic neutralizing amino alcohols which are effective co-dispersants with low or no VOC and have very low or no amine odor. The novel diamino alcohol compounds described above and in further detail hereinafter, are excellent low odor multifunctional amines with the benefit of having no or low VOC as measured by a method similar to the EPA Test Method 24 which is the required method for measuring the VOC of a finished paint formulation. An additional benefit of these products is that by design they can only contain primary amine functional groups which cannot generate toxic N-nitroso compounds.

SUMMARY OF THE INVENTION

The present invention provides a diamino alcohol compound having the formula:

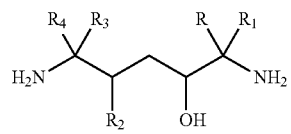

wherein R is independently hydrogen, alkyl, aryl, or —CH₂OH; R₁ is independently hydrogen, alkyl, or —CH₂OH; alternatively, R and R₁ may be linked together to form a cycloalkyl; R₂ is independently hydrogen, methyl, alkyl, phenyl or substituted phenyl; R₃ is independently hydrogen, alkyl, phenyl or substituted phenyl, or —CH₂OH; R₄ is independently hydrogen, alkyl, or —CH₂OH; and alternatively, R₃ and R₄ may be linked together to form a cycloalkyl.

The present invention also provides a process for the production of the aforesaid diamino alcohol compound, comprising reacting (1) a primary or secondary nitroalkane and (2) an α,β-unsaturated aldehyde to form a dinitro alcohol; and then further reduce the nitro alcohol to the corresponding diamino alcohol under hydrogenation conditions and in the presence of a catalyst. The reaction is performed under conditions in which Michael addition of the nitroalkane occurs more rapidly than the Henry reaction, allowing for the sequential reactions to produce a dinitroalcohol. The (1) nitroalkane and the (2) aldehyde are provided at a molar ratio of 2:1 during the first reaction step which produces the dinitro alcohol. The primary or secondary nitroalkane may be a $C_1$-$C_{20}$ nitroalkane. The α,β-unsaturated aldehyde may be selected from the group consisting of: acrolein, crotonaldehyde and cinnamaldehyde.

Where the desired product is a diamino poly-alcohol compound, the (1) nitroalkane is a primary nitroalkane and the process for production of the diamino poly-alcohol compound further comprises, after reacting the (1) primary nitroalkane and (2) α,β-unsaturated aldehyde, but prior to reducing the resulting nitro alcohol, further reacting the resulting nitro alcohol with (3) an aldehyde, such as formaldehyde, to form a dinitro poly-alcohol compound, which is then further reduced under hydrogenation conditions and in the presence of a catalyst.

The present invention further provides an aqueous coating formulation with the diamino alcohol compound. More particularly, the aqueous coating formulation comprises: (a) 25-99% by weight of an aqueous carrier comprising water and at least one resin; (b) up to 20% by weight of a pigment; and (c) 0.01 to 5% by weight of the aforesaid diamino alcohol compound, wherein all weight percents are based on the total weight of the aqueous coating formulation. The resin is a polymer comprising units derived from at least one monomer selected from the group consisting of: alkyl acrylates, alkyl methacrylates, styrene-butadiene, vinyl esters of an aliphatic acid, acrylic acid esters, methacrylic acid esters of an alcohol and mono- and di-ethylenically unsaturated hydrocarbons. The pigment may be one or more of: titanium dioxide and other titanium pigments, white lead, zinc oxide, zinc sulfide, barium sulfate, calcium carbonate, lithopone, silica, talc, mica, clays, iron oxide, carbon black, cadmium sulfide, toluidine red, chrome orange, chrome yellow, chrome green.

BRIEF DESCRIPTION OF THE DRAWINGS

A more complete understanding of the present invention will be gained by reference to the accompanying Figure which provides bar graphs comparing characteristics of coating formulations prepared with a diamino alcohol of the present invention and with various commercially available amine compounds.

DETAILED DESCRIPTION OF THE INVENTION

A new and useful class of amino compound, namely diamino alcohols, has been discovered, along with processes for their manufacture. These compounds are produced by tandem Michael and Henry reaction of nitroalkanes with one or more α,β-unsaturated aldehydes and, optionally, post reacted with an aldehyde such as formaldehyde. As a result, the diamino alcohol compounds produced have primary amine groups, preferably bonded to tertiary carbon atoms, with low content of volatile organic compounds (VOCs). They may be represented by the following formula:

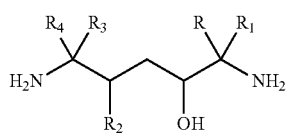

wherein R is independently hydrogen, alkyl, aryl, or —$CH_2OH$; $R_1$ is independently hydrogen, alkyl, or —$CH_2OH$; alternatively, R and $R_1$ may be linked together to form a cycloalkyl; $R_2$ is independently hydrogen, methyl, alkyl, phenyl or substituted phenyl; $R_3$ is independently hydrogen, alkyl, phenyl or substituted phenyl, or —$CH_2OH$; $R_4$ is independently hydrogen, alkyl, or —$CH_2OH$; and alternatively, $R_3$ and $R_4$ may be linked together to form a cycloalkyl.

The foregoing category of diamino alcohols includes various degrees of poly-alcohols ("polyols") as well as simple diamino mono-alcohols. The simpler diamino mono-alcohols would have the following formula:

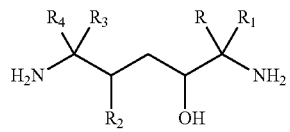

wherein R is independently hydrogen, alkyl, phenyl or substituted phenyl; $R_1$ is independently hydrogen or alkyl; alternatively, R and $R_1$ may be linked together to form a cycloalkyl; $R_2$ is independently hydrogen, alkyl, or phenyl or substitued phenyl; $R_3$ is independently hydrogen, alkyl, or aryl; $R_4$ is independently hydrogen or alkyl; and alternatively, $R_3$ and $R_4$ may be linked together to form a cycloalkyl.

The diamino mono-alcohols of the present invention may be produced by reaction of a nitroalkane and an α,β-unsaturated aldehyde which produces an intermediate dinitro alcohol compound. This reaction is typically operated at temperatures between 0° C. and 100° C. under atmospheric pressure, for example, without limitation between 0° C. and 50° C. Applicants have surprisingly and conveniently found that this reaction proceeds sequentially with Michael addition of nitroalkane to the olefin occurring first, followed by aldol (Henry) reaction in which the second nitroalkane is added to the aldehyde, to produce a single species of dinitro mono-alcohol intermediate.

The nitroalkane may be a primary or secondary nitroalkane having the formula:

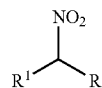

wherein R is hydrogen, $R^1$ is hydrogen, alkyl, phenyl or substituted phenyl; or wherein R is alkyl, phenyl, or substituted phenyl, and $R^1$ is alkyl, or R and $R^1$ may be linked together to form a cycloalkyl. For example, without limitation, nitromethane, nitroethane, 2-nitropropane, nitrocyclohexane etc. are all suitable nitroalkanes for use as starting materials to prepare the diamino alcohol compounds in accordance with the present invention. More particularly, the primary or secondary nitroalkane may be a $C_1$-$C_{20}$ nitroalkane, a $C_1$-$C_{10}$ nitroalkane, or even a $C_2$-$C_6$ nitroalkane.

Suitable α,β-unsaturated aldehydes have the following formula:

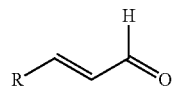

wherein R is hydrogen, methyl(alkyl), phenyl, or substituted phenyl. Suitable unsaturated aldehydes include, but are not limited to, acrolein, crotonaldehyde, cinnamaldehyde, derivatives of cinnamaldehyde substituted at the aromatic ring, etc.

The foregoing sequential Michael-Henry reaction between the nitroalkane and unsaturated aldehyde occurs in the presence of a suitable catalyst including, but not limited to, organic bases such as 1,8-Diazabicyclo[5.4.0]undec-7-ene ("DBU"), 2-dimethylamino-2-methyl-1-propanol ("DMAMP"), trimethylamine (TMA), dimethylisopropylamine (DMIPA), N,N,N',N'-tetramethylguanidine (TMG), Verkade's base, etc. Alternatively, inorganic bases such as potassium carbonate, and sodium hydroxide may also be used as catalysts for the sequential Michael-Henry reaction described above.

The starting materials are provided at a molar ratio of nitroalkane to aldehyde of typically 2:1. The reaction may be performed with or without a solvent, according to the preference of the practitioner. Suitable solvents include but are not limited to tetrahydrofuran, 2-methyltetrahydrofuran, dioxane.

Where the desired product is a diamino poly-alcohol compound, the (1) nitroalkane is a primary nitroalkane and the process for production of the diamino poly-alcohol compound further comprises, after reacting the (1) primary nitroalkane and (2) α,β-unsaturated aldehyde, but prior to reducing the resulting nitro alcohol, further reacting the resulting nitro alcohol with (3) an aldehyde, such as formaldehyde, to form a dinitro poly-alcohol compound, which is then further reduced under hydrogenation conditions and in the presence of a catalyst.

More particularly, the production of diamino poly-alcohol (polyol) compounds proceeds as follows: (A) reacting (1) a primary nitroalkane and (2) an α,β-unsaturated aldehyde to form a dinitroalcohol; (B) further reacting the dinitroalcohol with (3) an aldehyde, such as formaldehyde, to form a dinitro poly-alcohol (e.g., a dintro-dialcohol or dinitro-trialcohol) product; and (C) then further reducing the dinitro poly-alcohol product to the corresponding diamino poly-alcohol product under hydrogenation conditions, in the presence of a catalyst. The reaction is performed under conditions in which the Michael addition of the nitroalkane occurs more rapidly than the Henry reaction (i.e., temperatures between 0° C. and 100° C. under atmospheric pressure, for example, without limitation, between 0° C. and 50° C.), allowing for the sequential reactions to produce the dinitro poly-alcohol. The (1) nitroalkane and the (2) aldehyde are provided at a molar ratio of 2:1 during the first reaction step which produces the dinitro alcohol. The primary nitroalkane may be a primary $C_1$-$C_{20}$ nitroalkane, for example, without limitation, a primary $C_1$-$C_{10}$ nitroalkane. The α,β-unsaturated aldehyde may be selected from the group consisting of: acrolein, crotonaldehyde, cinnamaldehyde, and derivatives of cinnamaldehyde substituted at the aromatic ring.

The subsequent reaction of the dinitro alcohol with a second aldehyde, such as formaldehyde, occurs after the completion of the reaction to form the nitro alcohol has been confirmed (e.g, such as by analytical methods known to persons of ordinary skill in the art including, but not limited to, gas chromatography or high-performance liquid chromatography). The ratio of the formaldehyde to the dinitro alcohol is typically 2:1 for this sequential reaction step. Again, this reaction may be performed with or without a solvent, according to the preference of the practitioner, such as, without limitation, tetrahydrofuran, 2-methyltetrahydrofuran, dioxane.

The intermediate dinitro alcohol compound produced by either of the above-described sequential Michael-Henry reactions has the following formula:

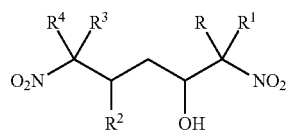

wherein R is independently hydrogen, alkyl, aryl, or —$CH_2OH$; $R^1$ is independently hydrogen, alkyl, or —$CH_2OH$; alternatively, R and $R^1$ may be linked together to form a cycloalkyl; $R^2$ is independently hydrogen, methyl, alkyl, phenyl or substituted phenyl; $R_3$ is independently hydrogen, alkyl, phenyl or substituted phenyl, or —$CH_2OH$; $R^4$ is independently hydrogen, alkyl, or —$CH_2OH$; and alternatively, $R^3$ and $R^4$ may be linked together to form a cycloalkyl.

In a particular embodiment, the nitroalkane is 2-nitropropane and the α,β-unsaturated aldehyde is either crotonaldehyde or cinnamaldehyde, which would produce a dinitro mono-alcohol compound.

The dinitro alcohol intermediate, whether mono- or poly-alcohol, is then further reduced under hydrogenation conditions in the presence of a suitable catalyst to produce the desired diamino alcohol comprising two amino groups, each of which is bonded to a tertiary carbon atom. Suitable dehydrogenation catalysts include, without limitation, Raney nickel, or a platinum- or palladium-based catalyst, (e.g., platinum or palladium in elemental form or as oxides, with or without supports, e.g., carbon). Other suitable reducing agents include, without limitation, metal/acid combinations, e.g., iron/acetic acid; and aluminum hydrides. An example of a dehydrogenation catalyst system suitable for use in accordance with the present invention is hydrogen gas in combination with any of Raney nickel, platinum or palladium.

The hydrogenation of dinitro alcohol to produce the diaminoalcohol may be performed at pressures between 100 and 1000 pounds per square inch ("psi") and temperatures between 30° C. and 100° C. A solvent may be used, such as, without limitation, tetrahydrofuran or methanol.

The resulting diamino alcohol compounds provide improved characteristics when used as a dispersant in coating formulations such as, without limitation, aqueous-based paints and films. Aqueous coating formulations in which the diamino alcohol compounds of the present invention are used, rather than the previously known amines such as AMP, have lower VOC content and low odor while still resulting in good dispersion of the pigments in the formulation.

For example, in one embodiment, an aqueous coating formulation in accordance with the present invention, may comprise (a) up to 99% by weight of an aqueous carrier comprising water and at least one resin; (b) up to 20% by weight of a pigment; and (c) 0.01 to 5% by weight of a dispersant which comprises a diamino alcohol compound having the formula:

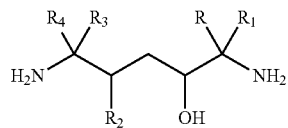

wherein R is independently hydrogen, alkyl, aryl, or —$CH_2OH$; $R_1$ is independently hydrogen, alkyl, or —$CH_2OH$; alternatively, R and $R_1$ may be linked together to form a cycloalkyl; $R_2$ is independently hydrogen, methyl, alkyl, phenyl or substituted phenyl; $R_3$ is independently hydrogen, alkyl, phenyl or substituted phenyl, or —CH$_2$OH; R$_4$ is independently hydrogen, alkyl, or —CH$_2$OH; and alternatively, R$_3$ and R$_4$ may be linked together to form a cycloalkyl; wherein all weight percents are based on the total weight of the aqueous coating formulation.

Many types of resins are known and used in the aqueous carrier of aqueous coating formulations. Particularly common are those based on an acrylate polymer latex, wherein the acrylate polymer is a lower alkyl ester, such as a methyl, ethyl or butyl ester, of acrylic and methacrylic acids, and copolymers of such esters with other ethylinically unsaturated co-polymerizable monomers which are known to the art to be suitable in the preparation of acrylic polymer latexes, can also be utilized. Suitable co-monomers include vinyl acetate, which may be used as a co-monomer with, for instance, butyl acrylate in a ratio of 70/30 or smaller of the vinyl acetate to the butyl acrylate. Acrylic resins of the acrylate and methacrylate type are well known for their suitability in house paints.

Other resins known and used in aqueous coating formulations include, without limitation, homopolymers and copolymers of: (1) vinyl esters of an aliphatic acid, such as vinyl acetate, (2) acrylic acid esters and methacrylic acid esters of an alcohol, such as methyl acrylate, ethyl acrylate, butyl acrylate, 2-ethylhexyl acrylate, methyl methacrylate, ethyl methacrylate and butyl methacrylate; and (3) mono- and di-ethylenically unsaturated hydrocarbons, such as ethylene, isobutylene, styrene, and alipatic dienes, such as butadiene, isoprene, and chloroprene.

It is also well known to use poly(vinyl acetate) and copolymers of vinyl acetate with one or more of the following monomers; vinyl chloride, vinylidene chloride, styrene, vinyltoluene, acrylonitrile, methacrylonitrile, one or two of the acrylic and methacrylic acid esters mentioned above. Similarly, copolymers of one or more of the acrylic or methacrylic acid esters mentioned above with one or more of the following monomers: vinyl acetate, vinyl chloride, vinylidene chloride, styrene, vinyltoluene, acrylonitrile, and methacrylonitrile are also more or less conventionally employed in aqueous coating formulations. Homopolymers of ethylene, isobutylene, and styrene, and copolymers of one or more of these hydrocarbons with one or more esters, nitriles or amides of acylic acid or of methacrylic acid or with vinyl esters, such as vinyl acetate and vinyl chloride, or with vinylidene chloride are also used. The diene polymers are generally used in aqueous coating formulations in the form of copolymers with one or more monomers following: styrene, vinyltoluene, acrylonitrile, methacrylonitrile, esters of acrylic acid or methacrylonitrile, and esters of methacrylic acid.

The pigments are not particularly limited and many are well-known and used by persons of ordinary skill in the relevant art. Some typical pigments include, without limitation, titanium dioxide and other titanium pigments, white lead, zinc oxide, zinc sulfide, barium sulfate, calcium carbonate, lithopone, silica, talc, mica, clays, iron oxide, carbon black, cadmium sulfide, toluidine red, chrome orange, chrome yellow, and chrome green. Particularly suitable pigments include, without limitation, as titanium dioxide (e.g., TIPURE® R942 commercially available from DuPont, located in Wilmington, Del., USA) and ground calcium carbonate (e.g., OMYACARB® UF commercially available from Omya, Inc., located in Cincinnati, Ohio, USA).

The aqueous coating formulation of the present invention may also include various other types of additives, aids and agents, for example, a coalescing aid, a thickening aid, a dispersing aid, a binder, a rheology modifier, a crosslinking agent, a wetting agent, a defoamer and a biocide.

Suitable crosslinking agents may also be included and are well known in the art, such as, for instance, trimethylolpropane triacrylate.

Suitable binders include, without limitation, UCAR™ Latex 379 and 6030, both commercially available from Arkema Chemicals, located in Philadelphia, Pa., USA.

Suitable thickeners and rheology modifiers include, without limitation, hydroxyethylcellulose (e.g., CELLOSIZE™ HEC commercially available from The Dow Chemical Company, located in Midland, Mich., USA) and solvent-free, non-ionic associative thickening agent/hydrophobically modified polyethylene oxide urethane-HEUR (ACRYSOL™ RM-5000 commercially available from Dow Advanced Materials, located in Philadelphia, Pa., USA).

Defoamers such as, without limitation, DREW PLUS Y-381 commercially available from Ashland, located in Covington, Ky., USA, are also suitable for use with the present invention As described in further detail hereinafter, performance of the diamino alcohol compounds of the present invention are tested as neutralizing, co-dispersing agents and compared relative to commercial neutralizers in an aqueous based, latex semi-gloss formulation. The comparative neutralizers include 2-methyl-2-aminopropanol (AMP), 2-ethyl-2-amino-1,3-propanediol (AEPD) and N-butyldiethanolamine (NBDA).

EXAMPLES

Example 1

Synthesis of 2,5,6-trimethyl-2,6-dinitroheptan-3-ol

Dinitro Alcohol Intermediate

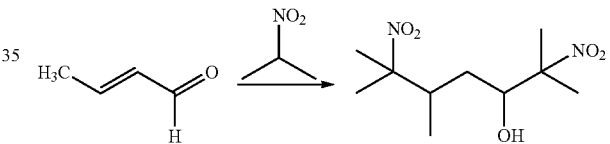

A three neck round bottom flask equipped with a stir bar, thermocouple, dropping funnel capped with nitrogen inlet and condenser was charged with 2-nitropropane ("2-NP") (50 g, 0.56 mols, 5.0 equivalents) and catalytic amount of DBU. The yellow solution was mixed under nitrogen for about thirty minutes. To this mixture was added crotonaldehyde (7.9 g, 9.2 mL, 0.112 moles, 1.0 equivalent) drop-wise over a period of twenty minutes. The addition of crotonaldehyde was done at three different conditions, as follows, and all of them yielded the same results.
Conditions:
A: Dropwise addition of crotonaldehyde when the 2-NP/DBU mixture is at −30° C. and warm to room temperature.
B: Dropwise addition of crotonaldehyde when the 2-NP/DBU mixture is at 20° C. and warm to room temperature.
C: Dropwise addition of crotonaldehyde when the 2-NP/DBU mixture is at room temperature In each case, after complete addition, the reaction was stirred for approximately 5-6 hours at room temperature. During this time, white solid crashed out of the solution. At this point, GC analysis showed the absence of any crotonaldehyde in the reaction mixture. After letting the reaction mixture stir overnight at room temperature and under nitrogen, the white solid was isolated by vacuum filtration and the solid was washed thoroughly with water. The solid was air dried, followed by vacuum drying, at 45° C. The total yield of the desired nitro alcohol was 72% (27.8 g). Nuclear magnetic resonance testing ("NMR") and liquid chromatography (LC) showed that the product was >99% pure. $^1$H NMR (CDCl$_3$):

δ 0.82-1.56 (m, 18H), 4.02-4.07 (m, 1H). $^{13}$C NMR (CDCl$_3$): δ 14.1, 20.7, 22.5, 23.1, 23.6, 33.5, 37.9, 73.1, 91.8 and 92.1 ppm. The reaction was also run with smaller molar ratio of the unsaturated aldehyde to nitroalkane. Similar results were obtained to the example above, when the ratio of unsaturated aldehyde to nitroalkane was 1:2.9.

Synthesis of 2,6-diamino-2,5,6-trimethylheptan-3-ol

Diamino Alcohol

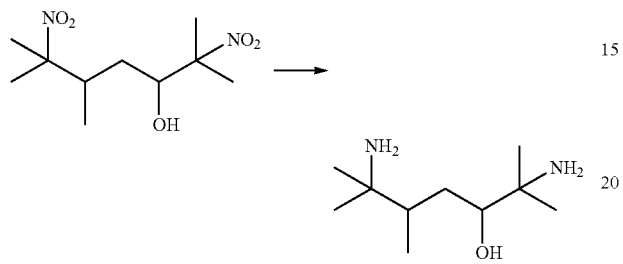

25 g of the nitro alcohol above was dissolved in 200 mL methanol and hydrogenated under in the autoclave at 60° C. using 14.2 g RaNi 3111 as a catalyst and at 600 psi pressure. After workup which included filtration of the catalyst and removal of methanol, approximately 11 g (59% yield) of the low viscous pale green/colorless liquid was obtained. NMR and gas chromatograph-mass spectroscopy ("GC-MS") analysis confirmed the presence of the desired amino alcohol. Chemical ionization mass spectrometry CI-MS showed [M+H]=189 and GC showed that purity of the material to be 94%. The boiling point of the material was approximately 110° C.-120° C. at 0.5-1.5 torr. The pKa of the amines was 10.12. $^{1}$H NMR (CDCl$_3$): δ 0.48-1.22 (m, 18H), 2.84-2.89 (m, 1H). $^{13}$C NMR (CDCl$_3$): δ 16.8, 25.2, 27.9, 30.8, 34.7, 42.2, 51.8, 52.8 and 77.3 ppm.

The diamino alcohol product of this Example 1 is labeled "CROT-AMP-NH2" in the accompanying figures.

Example 2

Synthesis of 6-methyl-3,7-dinitrononan-4-ol

Dinitro Alcohol Intermediate

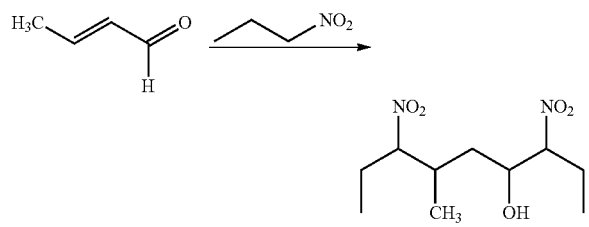

A three neck round bottom flask equipped with a stir bar, thermocouple, dropping funnel capped with nitrogen inlet and condenser was charged with 2-Nitropropane (50 g, 0.56 mols, 5.0 equivalents) and catalytic amount of DBU. The deep yellow solution was mixed under nitrogen for about thirty minutes. To this mixture was added crotonaldehyde (7.9 g, 9.2 mL, 0.112 moles, 1.0 equivalent) drop-wise over a period of twenty minutes. The addition of crotonaldehyde in this case was done at room temperature and during addition, exotherm of about 12° C.-15° C. was observed. After complete addition, the reaction was stirred at room temperature for 6 hours. At this point, GC analysis showed the absence of crotonaldehyde from the mixture. The reaction was let to stir at room temperature overnight and high-performance liquid chromatography (HPLC) analysis showed the presence of only two peaks which correspond to 1-NP which was in excess and the desired product (1CA+2NP adduct). Excess 1-NP was removed by vacuum distillation and the resulting orange viscous liquid was subjected to hydrogenation. This material was about 37.2 g total weight however it still had some 1-NP remaining.

Synthesis of 3,7-diamino-6-methylnonan-4-ol

Diamino Alcohol Intermediate

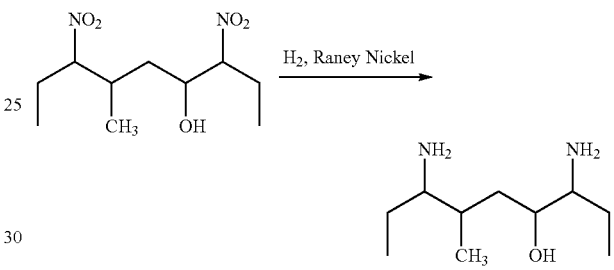

37.2 g of the nitro alcohol above was dissolved in 50 mL methanol and hydrogenated under hydrogen in the autoclave at 60° C., using 14.3 g RaNi 3111 as a catalyst and at 600 psi pressure. After workup which included filtration of the catalyst and removal of methanol, approximately 18 g (64% yield) of the low viscous yellow liquid was obtained. GC-MS analysis confirmed the presence of the desired amino alcohol. CI-MS showed [M+H]=189 and GC showed that purity of the material to be 50%. The rest were low boiling materials. The pKa of the amines was 9.85.

Example 3

Synthesis of 2,6-dimethyl-2,6-dinitro-5-phenylheptan-3-ol

Dinitro Alcohol Intermediate

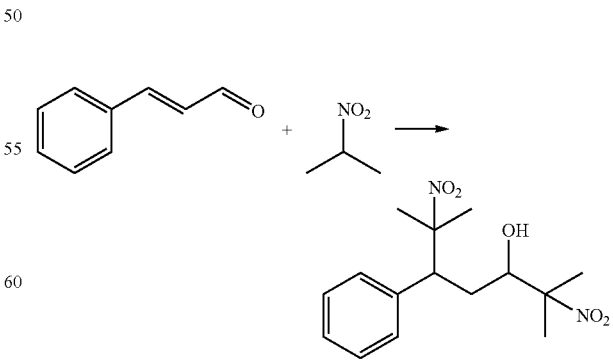

A three neck round bottom flask equipped with a stir bar, thermocouple, dropping funnel capped with nitrogen inlet and condenser was charged with 2-Nitropropane (101.1 g, 1.14 mols, 6.0 equivalents) and catalytic amount of DBU. The yellow solution was mixed under nitrogen for about twenty minutes. To this mixture was added trans-cinnamaldehyde (25.0 g, 0.19 moles, 1.0 equivalent) drop-wise over a period of twenty minutes. During addition of trans-cinnamidehyde to the nitro paraffin, an exotherm of approximately 22° C. was observed. After complete addition, the reaction mixture was heated to 50° C. for 4 h. After the heating time, the mixture was let to cool down slowly to room temperature. When the reaction mixture temperature reached 36.8° C., a pale yellow solid crashed out of the solution. The solid was filtered through a Buchner funnel and washed thoroughly with pentane and ether. The white powder was let to dry under vacuum for 1 hour. The total yield of the desired nitro alcohol was 62% (36 g). NMR showed that the product was >99% pure. $^1$H NMR (CDCl$_3$): δ 1.45-2.27 (m, 15H), 3.52-3.54 (m, 1H), 3.67-3.74 (m, 1H), 7.17-7.34 (m, 5H). $^{13}$C NMR (CDCl$_3$): δ 20.8, 22.4, 23.2, 25.8, 31.3, 50.3, 72.9, 91.5, 91.6, 128.1, 128.7, 129.4, 136.6 ppm.

Synthesis of
2,6-diamino-2,6-dimethyl-5-phenylheptan-3-ol

Diamino Alcohol

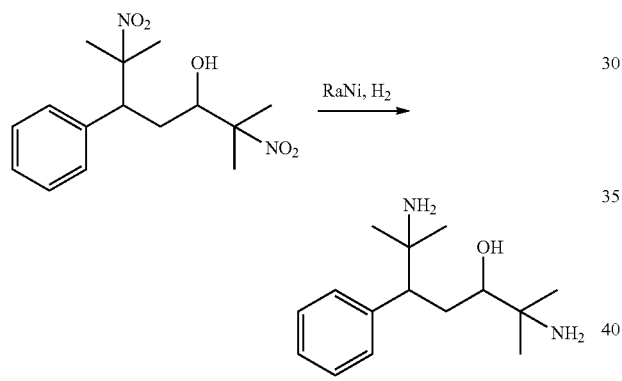

50 g of the nitro alcohol above was dissolved in 300 mL methanol and hydrogenated in the autoclave at 60° C. using 24.3 g RaNi 3111 as a catalyst and at 600 psi pressure. After workup which included filtration of the catalyst and removal of methanol, approximately 40 g (68% yield) of the high viscous pale yellow/colorless liquid was obtained. NMR and GC-MS analysis confirmed the presence of the desired amino alcohol. CI-MS showed [M+H]=251 and GC showed that purity of the material to be 78% straight from the autoclave. The rest of the material seems to be the mono adduct obtained from the reversal of the Henry reaction. The mixture was purified by vacuum distillation and approximately 96.2% purity of the desired material was obtained. The boiling point of the material was approximately 145° C.-155° C. at 0.9-1.1 torr. The pKa of the amines was 9.65. The VOC of the material, as determined by modified EPA Method 24, is 4.4%. $^1$H NMR (CDCl$_3$): δ 0.91-0.99 (m, 12H), 1.67-1.81 (m, 3H), 2.71-2.76 (m, 2H), 7.08-7.23 (m, 5H). $^{13}$C NMR (CDCl$_3$): δ 24.6, 27.9, 28.3, 29.8, 31.6, 51.8, 52.6, 54.2, 75.9, 126.3, 127.8, 129.4, 142.0 ppm.

The diamino alcohol product of this Example 3 is labeled "CINNAM-AMP-NH2" in the accompanying figures.

The diamino alcohol compounds prepared in Examples 1 and 3 are compared with commercially available amino compounds which are currently used in aqueous coating formulations for dispersion of pigments. The following list provides the labels and sources of the known and commercially available amino compounds used for comparison:

AMP 95=amine compound (2-amino-2-methyl-1-propanol), available from ANGUS Chemical Company, a wholly owned subsidiary of the Dow Chemical Company of Midland, Mich., USA, that is useful as a dispersant in coating formulations.

N-Butyl-diethanolamine (NBDA)=Also called Vantex® T an amine compound available from Taminco of Ghent, Belgium (and Atlanta, Ga., USA), advertised as useful as a dispersant having low VOC content and low odor for coatings formulations.

AEPD VOX 1000=amine compound, available from ANGUS Chemical Company, a wholly owned subsidiary of the Dow Chemical Company of Midland, Mich., USA, that is useful as a dispersant in coating formulations with reduced VOC content and odor.

The bar graphs of FIG. 1 show how the VOC content and pKa of each of the diamino alcohol compounds of Example 1 (CROT-AMP-NH2) and Example 3 (CINNAM-AMP-NP2) compare with those of the commercial amines.

Example 4

Coating Formulation

The 2,6-diamino-2,5,6-trimethylheptan-3-ol (CROT-AMP-NH2) prepared in Example 1 was tested as a neutralizing, co-dispersing amine and compared relative to AMP, AEPD (VOX 1000) and N-butyl-diethanolamine (Vantex T) in an aqueous based, latex semi-gloss coating formulation. The recipe for the coating (paint) formulation (using AMP as the dispersant) is provided in the table below. Other amines (Vantex T, VOV 1000 and the diamino alcohol from Example 1) were used in equimolar amounts with respect to their molecular weight.

| ANGUS - Interior Semi-gloss Pastel Base (with anionic surfactant substitution) | | | | |
|---|---|---|---|---|
| | mfr/supplier | s.g. | weight | wt g/6.25 mL |
| GRIND | | | | |
| Water | | 1.00 | 140.00 | 1.049 |
| Cellulosize HEC thickener QP 300 | Dow | 1.41 | 5.00 | 0.037 |
| Water | | 1.00 | 10.00 | 0.075 |
| agitate 10 minutes at high speed then add the following at low speed | | | | |
| Tamol 1124 dispersant | Rohm & Haas | 1.19 | 5.00 | 0.037 |
| Triton CF-10 nonionic surfactant | Dow | 1.08 | 2.00 | 0.015 |
| Triton GR-PG70 anionic surfactant | Dow | 1.11 | 0.43 | 0.003 |

ANGUS - Interior Semi-gloss Pastel Base (with anionic surfactant substitution)

| | mfr/supplier | s.g. | weight | wt g/6.25 mL |
|---|---|---|---|---|
| Drew Plus Y-381 defoamer | Ashland | 0.87 | 1.00 | 0.007 |
| Ethylene Glycol | Dow | 1.12 | 30.00 | 0.225 |
| AMP-95 | Dow | 0.94 | 2.00 | 0.015 |
| Omyacarb UF calcium carbonate | Omya | 2.72 | 25.00 | 0.187 |
| Water | | 1.00 | 20.00 | 0.150 |
| grind subtotal | | | 240.43 | 1.801 |
| Disperse at high speed for 15 minutes, check grind then add the following at low speed LETDOWN | | | | |
| UCAR Latex 379, vinyl acrylic | Dow | 1.09 | 375.00 | 2.809 |
| UCAR Latex 6030, acrylic | Dow | 1.06 | 47.00 | 0.352 |
| Butyl Carbitol coalescent | Dow | 0.95 | 6.00 | 0.045 |
| Archer RC reactive coalescent | ADM | 0.92 | 12.00 | 0.090 |
| Drew plus Y-381 defoamer | Ashland | 0.87 | 1.50 | 0.011 |
| TiPure R942 titanium dioxide slurry (76.5% solids) | DuPont | 2.33 | 250.00 | 1.873 |
| ACRYSOL RM-5000 rheology modifier | Rohm & Haas | 1.04 | 30.00 | 0.225 |
| water | | 1.00 | 64.58 | 0.484 |
| disperse at high speed for 10 minutes | | | | |
| Drew Plus Y-381 defoamer | Ashland | 0.87 | 1.50 | 0.011 |
| agitate at low speed for 10 minutes | | | | |
| Formula total | | | 1028.00 | 7.700 |
| pH > 9.0 | | | | |
| Viscosity: 86-92 KU | | | | |
| Formula total | | | 1728.44 | |

The diamino alcohol of Example 1, (2,6-diamino-2,5,6-trimethylheptan-3-ol/CROT-AMP-NP2), had about half the VOC content of AMP and performs equally or slightly better in most tests. The CROT-AMP-NH2 is also comparable in performance in coating formulations to commercially available amine additives AEPD VOX 1000 and VANTEX T and also has low odor. The bar graphs of FIG. 2 provide comparisons of the various relevant characteristics of the coating formulations prepared and evaluated with each of the amine compounds.

The pH, particle size, film opacity, gloss, and VOC of the formulations containing the various tested compounds are determined as follows:

Coating Optical Properties (Opacity and Gloss). The opacity, gloss at 20, 60, and 85° and color of the dried films is measured using an automated color/gloss/thickness robot based on a Symyx XCM module. The color is measured using an Ocean Optics ISP-REF integrating sphere with a 0.4" sampling aperture connected by a fiber optic cable to an Ocean Optics USB 4000 Spectrometer. Measurements are performed with D65 illumination. This apparatus is located on the left arm of a Symyx Core Module Robot which enables the colorimeter to be moved onto the sample in multiple locations. For this study measurements are done on three separate areas on both the black and white parts of each Leneta paper. The gloss is measured using a BYK micro-Trigloss Meter. This instrument is attached to the right arm of the Symyx Core Module Robot, along with a plate gripper used to move the samples from the BenchCel sample hotel to the deck of the Module. Gloss is measured in three different spots on the coatings over both the white and black parts of the Leneta paper.

Particle Size Analysis. The particle size distribution in the formulations is measured using a Beckman Coulter LS-230 Particle Size Analyzer using a Micro-Volume Accessory. One drop of the formulation is added to approximately 20 mL of deionized water, and shaken well. This diluted solution is then added drop wise to the micro-volume accessory by pipet until the absorbance reading is at least 8%. The sample is stirred continuously during the measurement. Particle sizes from 0.04 to 2000 microns can be detected. The particle size distribution of a garnet standard with nominal particle size 35 microns is measured to be 36±15 microns.

pH Measurements. The formulation pH is measured using a Fisher Scientific Accumet 15 pH meter, equipped with a ThermoElectron Orion 9203BN combination pH electrode. Commercial pH buffers are used to calibrate the equipment before each use. The reported vlaues are the average of three separate reading on each formulation, the probe is cleaned with DI water between each measurement.

Volatile Organic Content (VOC). VOC is measure following modified EPA Method 24. The VOC was measured for the neat amine only and not the fully formulated system. The amines are weighed in a pan and kept in an oven for 1 h at 105-110° C. The percent weight loss is reported as the VOC, corrected for the water content in the sample which can be measured by Karl Fisher Titration.

What is claimed is:
1. An aqueous coating formulation comprising:
   (a) 25-99% by weight of an aqueous carrier comprising water and at least one non-halogenated resin;
   (b) up to 20% by weight of a pigment;
   (c) 0.01 to 5% by weight of a diamino alcohol compound having the formula:

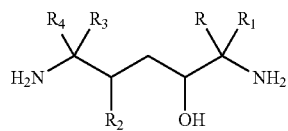

wherein the amine groups are primary amine groups and R is independently hydrogen, alkyl, aryl, or —CH$_2$OH; R$_1$ is independently hydrogen, alkyl, or —$CH_2OH$; alternatively, R and $R_1$ may be linked together to form a cycloalkyl; $R_2$ is phenyl; $R_3$ is independently hydrogen, alkyl, or phenyl or —$CH_2OH$; $R_4$ is independently hydrogen, alkyl, or —$CH_2OH$; and alternatively, $R_3$ and $R_4$ may be linked together to form a cycloalkyl;

wherein all weight percents are based on the total weight of the aqueous coating formulation.

2. The aqueous coating formulation according to claim 1, wherein said at least one resin is a polymer comprising units derived from at least one monomer selected from the group consisting of: alkyl acrylates, alkyl methacrylates, styrene-butadiene, vinyl esters of an aliphatic acid, acrylic acid esters, methacrylic acid esters of an alcohol and mono- and di-ethylenically unsaturated hydrocarbons.

3. The aqueous coating formulation according to claim 2, wherein said at least one resin is a polymer comprising units derived from at least one monomer selected from the group consisting of: methyl acrylate, ethyl acrylate, butyl acrylate, 2-ethylhexyl acrylate, methyl methacrylate, ethyl methacrylate and butyl methacrylate.

4. The aqueous coating formulation according to claim 3, wherein said at least one resin is a polymer further comprising units derived from at least one monomer selected from the group consisting of: mono- and di-ethylenically unsaturated hydrocarbons and aliphatic dienes.

5. The aqueous coating formulation according to claim 1, wherein said pigment is selected from the group consisting of: titanium dioxide and other titanium pigments, white lead, zinc, oxide, zinc sulfide, barium sulfate, calcium carbonate, lithopone, silica, talc, mica, clays, iron oxide, carbon black, cadmium sulfide, toluidine red, chrome orange, chrome yellow, chrome green.

6. The aqueous coating formulation according to claim 1, further comprising one or more materials selected from the group consisting of: a coalescing aid, a thickening aid, a dispersing aid, a binder, a rheology modifier, a crosslinking agent, a wetting agent, a defoamer and a biocide.

7. The aqueous coating formulation according to claim 1, wherein $R^3$ is phenyl.

* * * * *